United States Patent

[15] 3,641,522

[45] Feb. 8, 1972

Maegawa et al.

[54] INDUCTANCE ELEMENT FOR PREVENTING HALF-SELECT NOISE IN MEMORY ELEMENTS

[72] Inventors: Harumi Maegawa; Yohihiro Sato; Yasuo Furuhata; Takayuki Kiumi, all of Kawasaki-shi, Japan

[73] Assignee: Fujitsu Limited, Kawasaki, Japan

[22] Filed: Nov. 14, 1969

[21] Appl. No.: 876,772

[30] Foreign Application Priority Data

Nov. 16, 1968 Japan....................................43/83898

[52] U.S. Cl. .......................340/174 M, 29/604, 340/174 JA, 340/174 DC, 340/174 PW

[51] Int. Cl. ........................................G11c 7/02, G11c 5/08

[58] Field of Search ..............340/174 PW, 174 TF, 174 MA, 340/174 DC, 174 JA, 174 M; 29/604

[56] References Cited

UNITED STATES PATENTS

| | | | |
|---|---|---|---|
| 3,154,840 | 11/1964 | Shahbender | 340/174 R X |
| 3,315,086 | 4/1967 | Oshima et al. | 340/174 PW X |
| 3,391,396 | 7/1968 | McAlexander | 340/174 JA |
| 3,452,342 | 6/1969 | Raffel | 340/174 JA |
| 3,460,114 | 8/1969 | Chow | 340/174 PW |
| 3,465,308 | 9/1969 | Sasaki et al. | 340/174 PW |
| 3,487,385 | 12/1969 | Sakai | 340/174 PW |
| 3,000,004 | 9/1961 | Weller | 340/174 DC |

OTHER PUBLICATIONS

J. McNichol "Fabrication of Plated Stripline and Keeper" IBM Technical Disclosure Bulletin, Vol. 8, No. 9, Feb. 1966, pp. 1278-1279

*Primary Examiner*—Maynard R. Wilbur
*Assistant Examiner*—Michael K. Wolensky
*Attorney*—Curt M. Avery, Arthur E. Wilfond, Herbert L. Lerner and Daniel J. Tick

[57] ABSTRACT

Each of a plurality of magnetic wires has a conductor covered by ferromagnetic material. The magnetic wires are equidistantly spaced from each other in parallel relation and are affixed to each other by electrical insulating material interposed therebetween.

4 Claims, 20 Drawing Figures

INDUCTANCE ELEMENT FOR PREVENTING HALF-SELECT NOISE IN MEMORY ELEMENTS

DESCRIPTION OF THE INVENTION

Our invention relates to an inductance element. More particularly, the invention relates to an inductance element for preventing half-select noise in memory elements.

Our inductance element prevents the production of half-select noise in memory elements due to half-select word line current produced by a driving circuit which comprises switching cores in a memory matrix or device. Toroidal linear cores have been utilized as inductance elements in attempting to suppress half-select noise. Toroidal linear cores, however, are expensive. Furthermore, since the cores are of annular configuration, it is difficult, and involves a complicated process, to affix the cores to word lines.

The principal object of the invention is to provide a new and improved inductance element.

An object of the invention is to provide an inductance element for preventing half-select noise in memory elements.

An object of the invention is to provide an inductance element which overcomes the disadvantages of toroidal linear cores.

An object of the invention is to provide an inductance element which is inexpensive and may be affixed to word lines with facility and rapidity.

An object of the invention is to provide an inductance element which eliminates half-select noise in memory elements with efficiency, effectiveness and reliability.

In accordance with our invention, an inductance element comprises a plurality of magnetic wires. Each of the magnetic wires has a conductor and a ferromagnetic material covering the surface of the conductor. The magnetic wires are equidistantly spaced from each other in parallel relation. Electric insulating material is interposed between and affixes the magnetic wires to each other.

The ferromagnetic material may comprise a permalloy. The electrical insulating material may comprise flexible thermoplastic tape or Mylar tapes having a polyethylene film on their inside surfaces.

In order that the invention may be readily carried into effect, it will now be described with reference to the accompanying drawings, wherein.

Figures 5A, 5B:
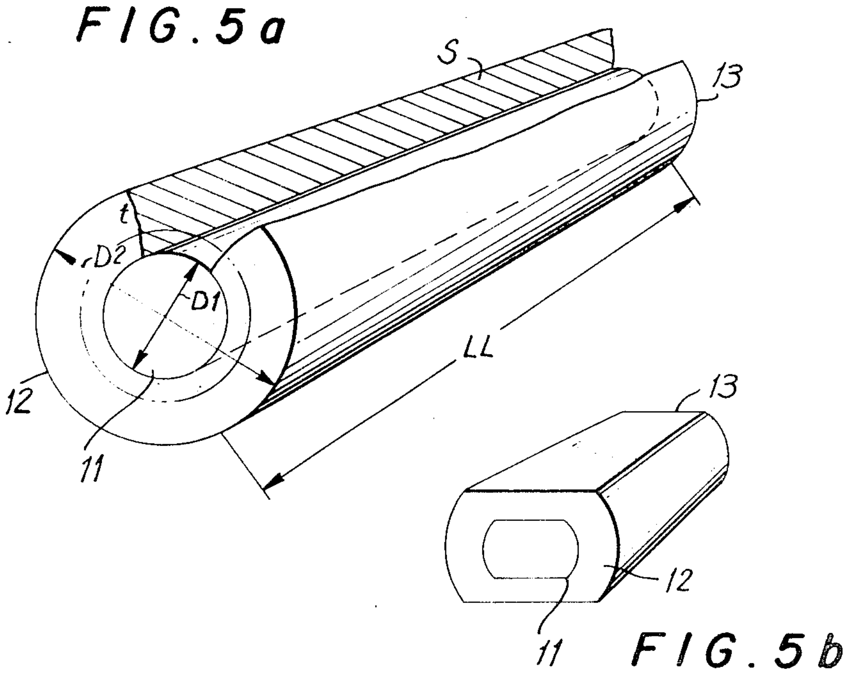
Figure 6:
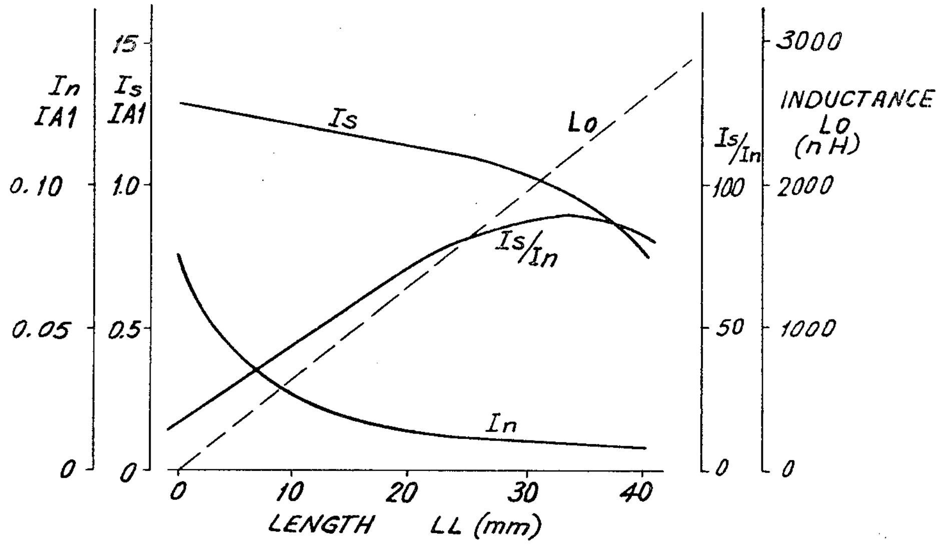
Figure 8A:
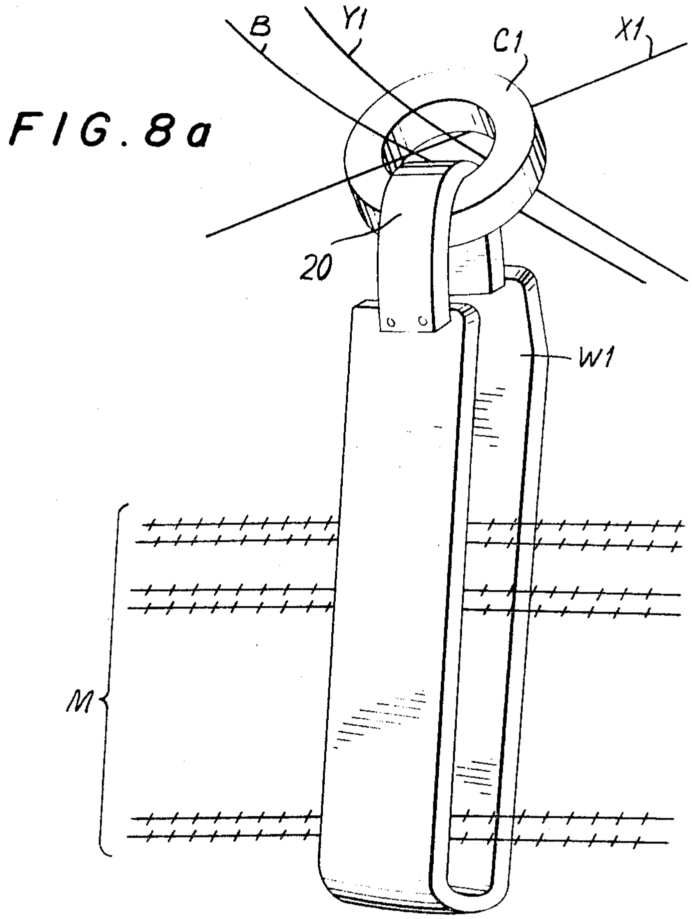
Figure 8B:
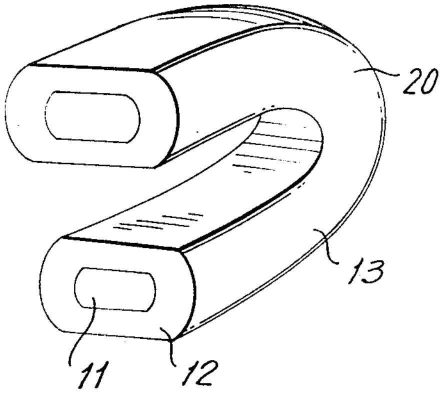
Figure 9A:
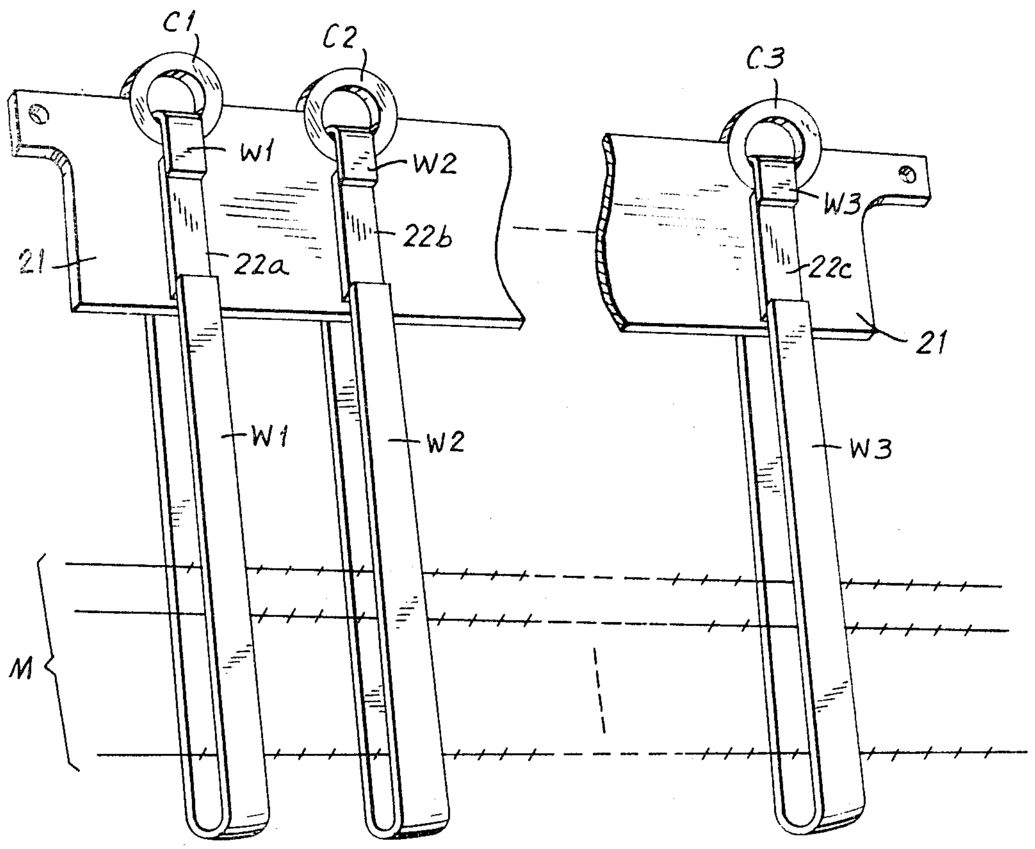
Figure 9B:
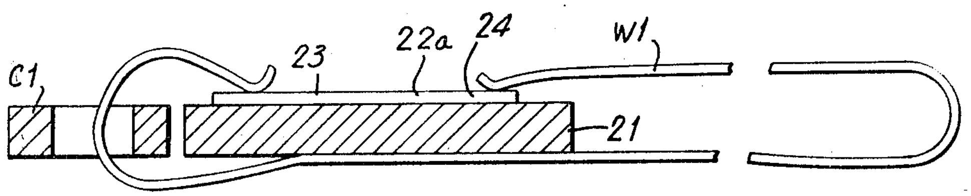
Figures 10A, 10B:
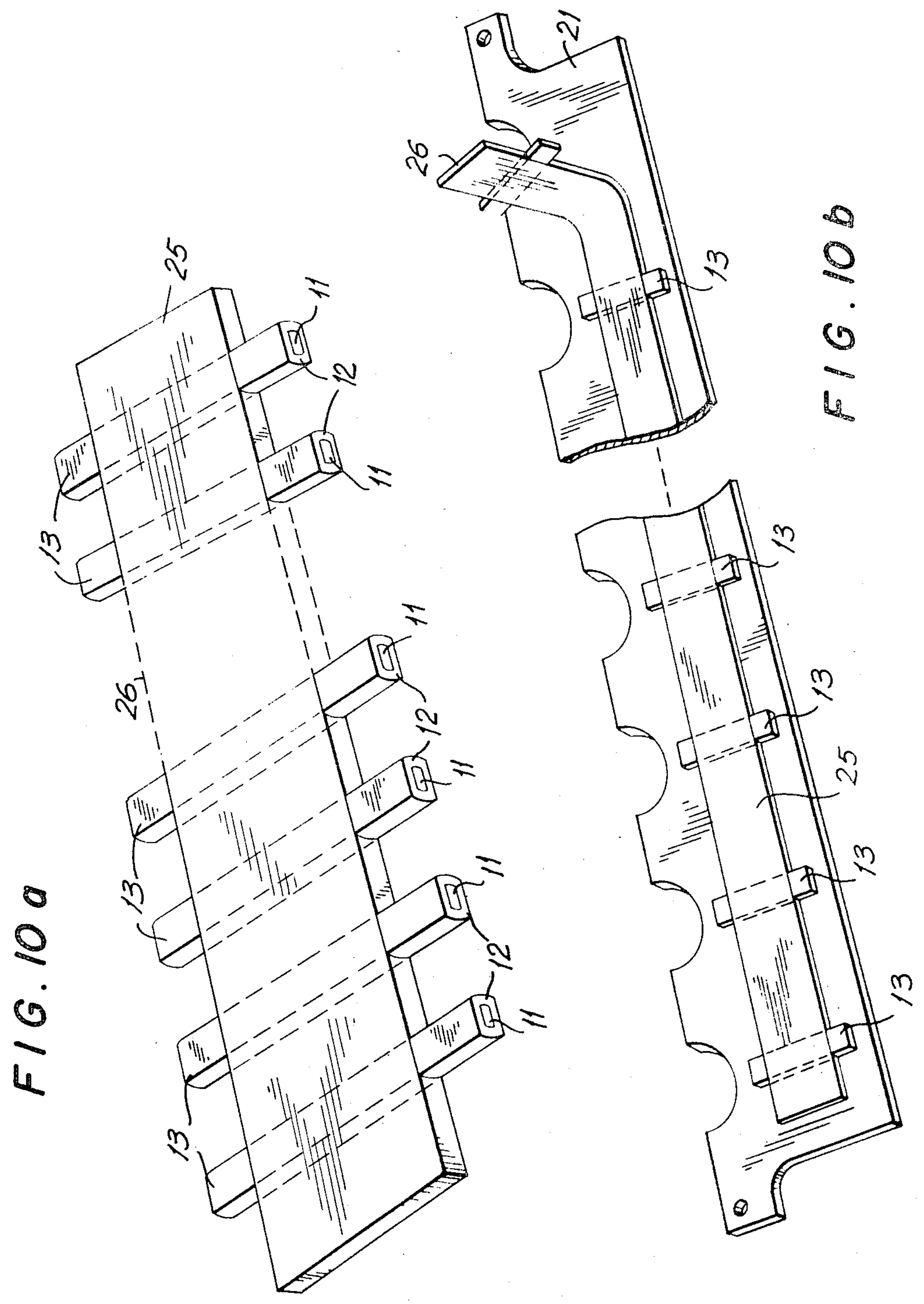
Figure 11A:
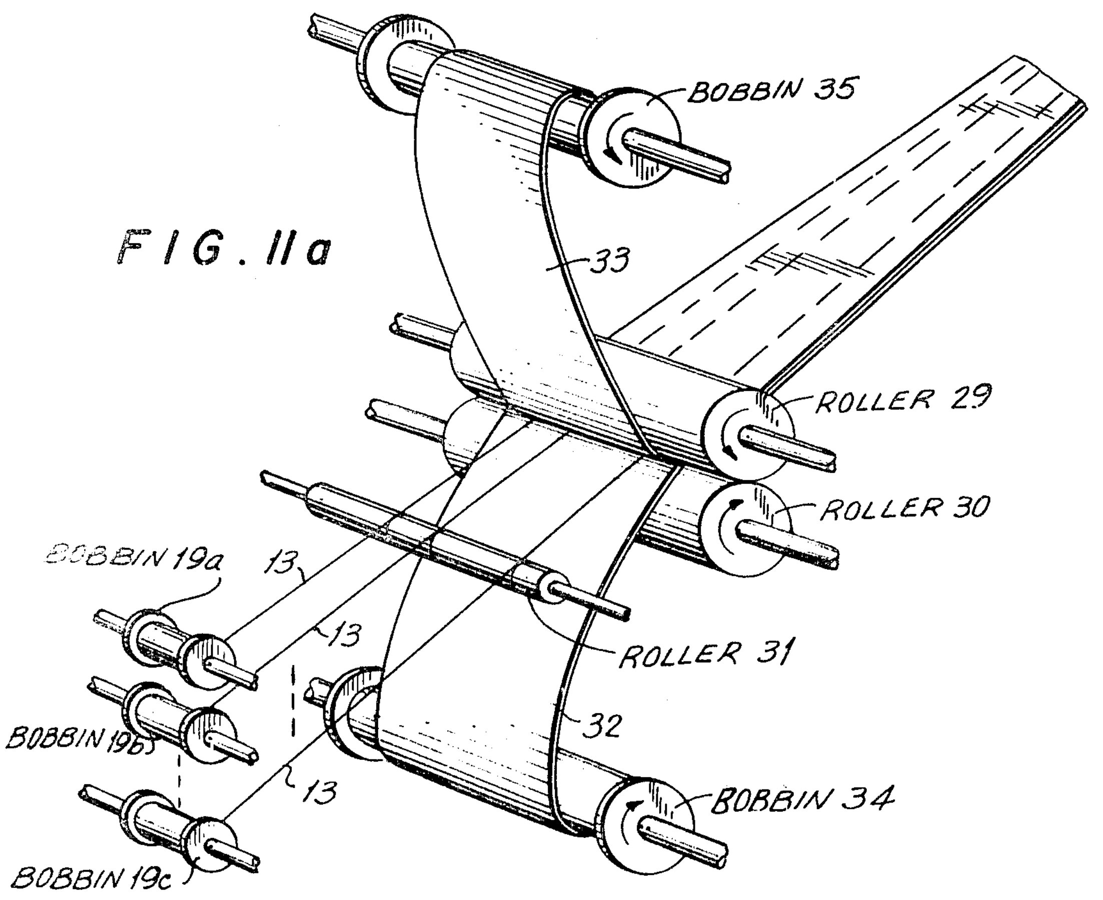
Figure 11B:
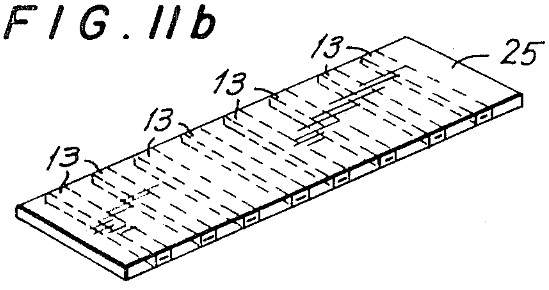
Figure 11C:
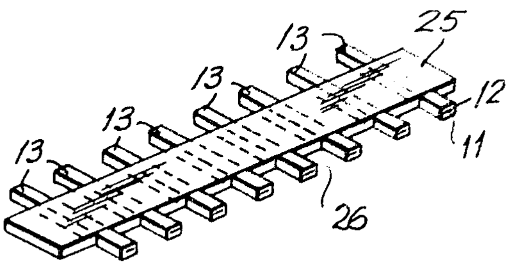

FIG. 5*a* is a schematic diagram of an embodiment of the inductance element of the invention;

FIG. 5*b* is a schematic diagram of another embodiment of the inductance element of the invention;

FIG. 6 is a graphical presentation illustrating the characteristics of a memory device utilizing the inductance element of the invention;

FIGS. 7*a*, 7*b*, 7*c* and 7*d* illustrate a mechanical method of manufacture of the inductance element of FIGS. 5*a* and 5*b*;

FIGS. 8*a* and 8*b* illustrate a method of mounting switching cores and word lines;

FIGS. 9*a* and 9*b* illustrate another method of mounting switching cores and word lines;

FIGS. 10*a* and 10*b* are schematic diagrams of an embodiment of the inductance element of the invention; and FIGS. 11*a*, 11*b* and 11*c* illustrate a method of manufacture of the inductance element of FIGS. 10*a* and 10*b*.

Figure 1:
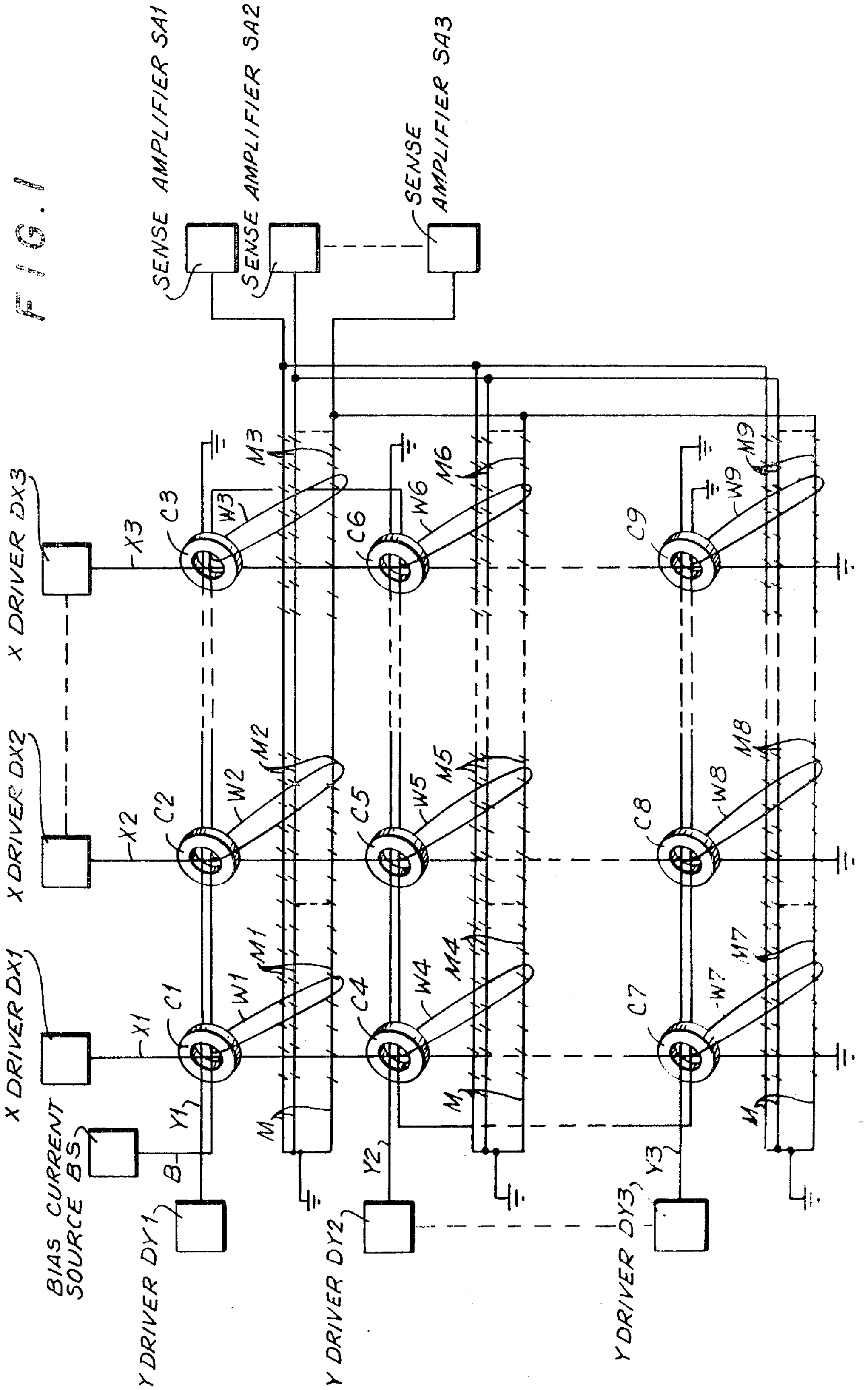
FIG. 1 is a schematic block diagram of a memory device.

FIG. 1 illustrates a general memory device. In FIG. 1, a plurality of switching cores C1, C2, C3, . . . C9 are controlled by a plurality of X drivers DX1, DX2, . . . DX3 and a plurality of Y drivers DY1, DY2, . . . DY3. Bias current is provided for the cores C1 to C9 by a bias current source BS. A plurality of sense amplifiers SA1, SA2, . . . SA3 are provided.

The X driver DX1 drives the corresponding cores via an X drive wire X1. The X driver DX2 drives the corresponding cores via an X drive wire X2. The X driver DX3 drives the corresponding cores via an X drive wire X3. The Y driver DY1 drives the corresponding cores via a Y drive wire Y1. The Y driver DY2 drives the corresponding cores via a Y drive wire Y2. The Y driver DY3 drives the corresponding cores via a Y drive wire Y2. The Y driver DY3 drives the corresponding cores via a Y drive wire Y3. The bias current source BS provides a negative bias current via a bias wire B.

A plurality of word lines W1, W2, . . . W9 are provided. A magnetic wire M functions as a memory element having memory parts M1, M2, . . . M9. Each of the X and Y drivers DX1, DX2, . . . DX3, DY1, DY2, . . . DY3 is a half-select driver which produces half-select positive pulses.

Figure 2:
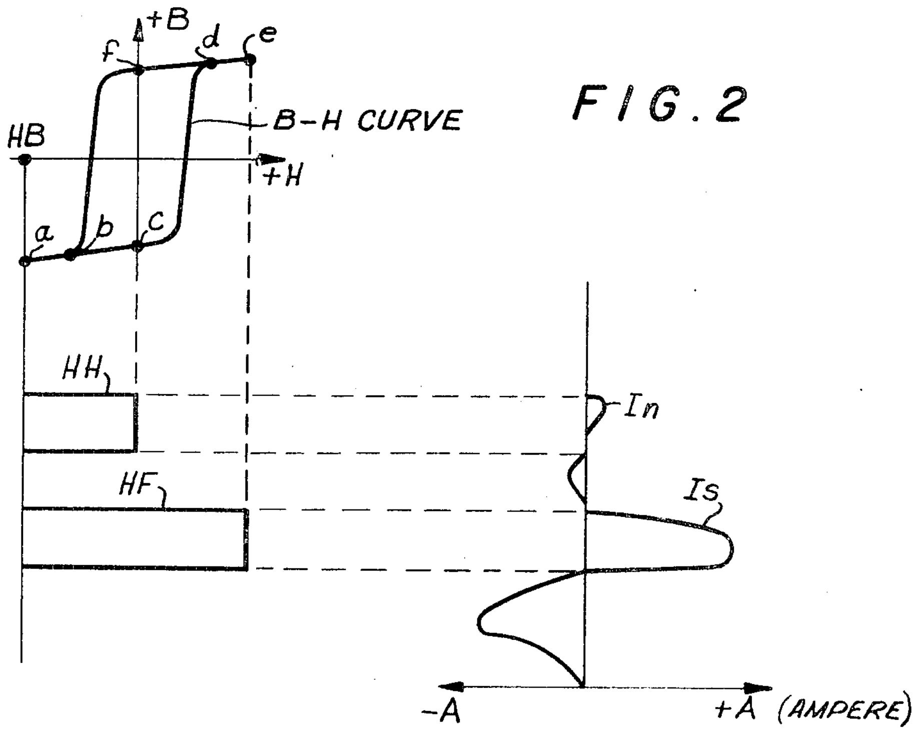
FIG. 2 is a graphical presentation explaining the operation of the memory device of FIG. 1.

FIG. 2 illustrates the B–H curve of the switching cores C1 to C9 of FIG. 1 and the principle of the method of driving said cores. In FIG. 2, a magnetic field HB is produced by the bias current provided by the source BS of FIG. 1. A magnetic field HH is produced by the half-select drive pulse, and a magnetic field HF is produced by the full-select drive pulse in FIG. 1. In FIG. 2, a half-selected word pulse is represented by In and a magnetic field full-selected word pulse is represented by Is.

The stable condition of the switching cores C1 to C9 of the memory device of FIG. 1 is at the point *a* of FIG. 2, due to the magnetic field HB produced by the bias current flowing through the bias wire B. If it is assumed that the X and Y drivers DX1 and DY1 are in operation and a half-select drive pulse is supplied from the X and Y drivers DX1 and DY1 to the X drive wire X1 and the Y drive wire Y1, respectively, a full-select drive pulse is supplied to the switching core C1 in FIG. 1. This is due to the fact that the switching core C1 in FIG. 1 is at the point of intersection of the two drive wires X1 and Y2. Consequently, a magnetic field HF is produced around the switching core C1 and the magnetization state or condition of said core changes in accordance with the curve *a*, *b*, *c*, *d*, *e*, *d*, *f*, *b*, *a* of FIG. 2.

Due to the change of the magnetization condition or state of the core C1, a full-selected word pulse Is is supplied to the word line W in FIG. 1. Consequently, the memory part M1 of the memory M is driven and the sense amplifiers SA1 to SA3 read out the output or memory information from said memory part. Furthermore, the half-select drive pulse is supplied to the switching cores C2, C3, C4, C7. The magnitude of the magnetic field HH produced by the half-select drive pulse is, however, half that of the magnetic field HF, so that the magnetization state or condition of the cores C2, C3, C4, C7 simply changes in accordance with the curve *a*, *b*, *c*, *b*, *a* of FIG. 2, and only a half-selected word pulse In is supplied to the word lines W2, W3, W4, W7.

Since the half-selected word pulse In cannot drive the memory parts M2, M3, M4, M7, no output is produced by said memory parts. However, the half-selected word pulse In produces half-select noise in the memory parts M2, M3, M4, M7, and such noise is added cumulatively and results in a considerably large noise. Consequently, it is difficult for the sense amplifiers SA1, SA2, SA3 to distinguish output signals from the memory part M1 from the half-select noise. This results, on occasion, in erroneous operation. For this reason, it is necessary to suppress the half-selected word pulse In which produces the half-select noise.

Figure 3:
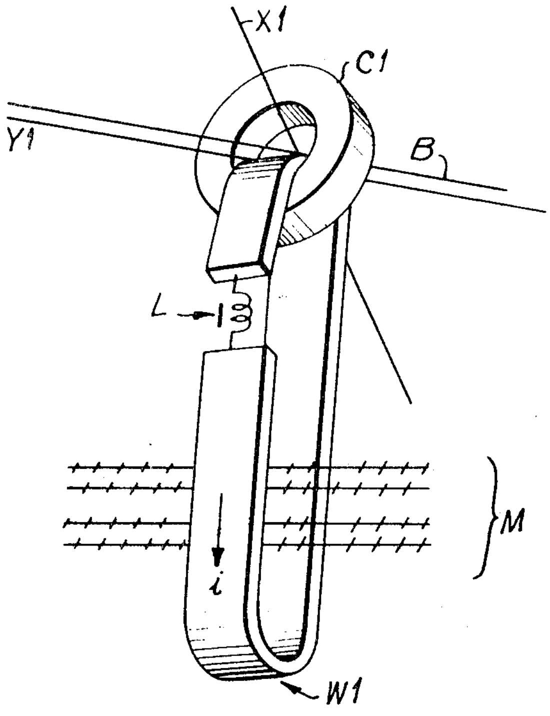
FIG. 3 illustrates the principle of the half-select noise eliminating method.
Figure 4:
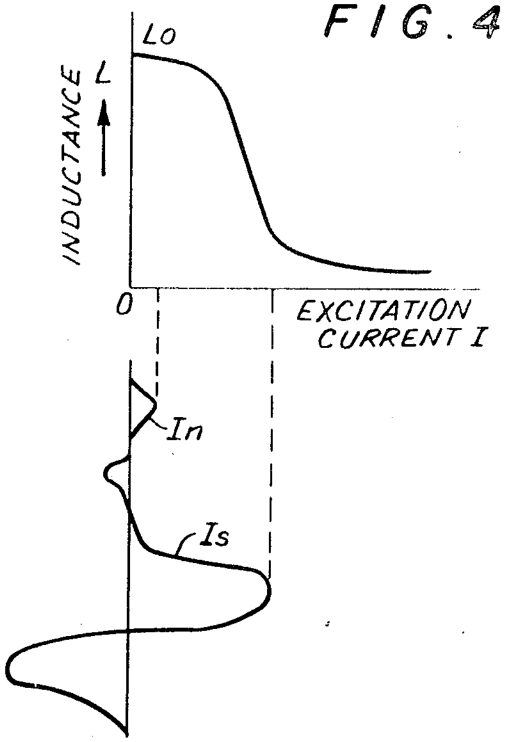
FIG. 4 is a graphical presentation explaining the principle of operation of the process illustrated in FIG. 3.

A method for suppressing the half-select noise is illustrated in FIG. 3. In FIG. 3, an inductance element L has an excitation current characteristic which is illustrated in FIG. 4. In FIG. 4, the abscissa represents the excitation current I and the ordinate represents the inductance L. As seen in FIG. 4, the inductance element L has a large inductance when the excitation current I has a small magnitude, and said inductance element has a small inductance when said excitation current has a large magnitude. The half-select noise may be suppressed by connecting the inductance element L, having the characteristic shown in FIG. 4, into a word line, as shown in FIG. 3.

If it is assumed that the switching core C1, as shown in FIG. 3, is selected, the magnetization condition of said core changes in accordance with the curve *a*, *b*, *c*, *d*, *e*, *d*, *f*, *b*, *a*, as shown in FIG. 2, so that said core produces large signals. The inductance element L has a small inductance when large signals are supplied to it, so that the word line W1 has a low impedance and the large signals produced in the core C1 are supplied primarily to said word line as the full-selected word pulse Is. Furthermore, when only the half-select drive pulse is supplied to the switching core C1, said core produces only small signals. Since the inductance element L has a large inductance when small signals are supplied to it, the word line W1 has a high impedance and the signals produced in the core C1 are scarcely supplied to said word line. That is, the half-selected word pulse In is scarcely supplied to the word line W1. Therefore, scarcely any half-select noise is produced in the memory part M1.

It is evident, from the foregoing, that half-select noise may be suppressed by utilizing an inductance element having a small inductance when large signals are supplied thereto and a large inductance when small signals are supplied thereto. Our invention comprises such an inductance element. FIGS. 5*a* and 5*b* illustrate magnetic wires which are utilized as the inductance element of our invention. The magnetic wires may be of cylindrical or band-shaped configuration, and may comprise any other suitable configuration. In each of FIGS. 5*a* and 5*b*, an electrical conductor 11 is covered by a ferromagnetic material 12.

The inductance *L* of the inductance element *L* or magnetic wire 13 may be expressed as $$L=4\pi\mu SN^2/(LL)m$$

wherein $\mu$ is the magnetic characteristic initial permeability, *S* is the longitudinal sectional area of the ferromagnetic material 12, *N* is the number of windings, *m* is the average length of the magnetic path and *LL* is the length of the inductance element.

The inductance of the magnetic wire or inductance element 13 of cylindrical configuration, as shown in FIG. 4*a*, may thus be expressed as $$Lo=4(D2-D1)/D2+1\ (\mu o)\ (LL)$$

wherein *D*1 is the diameter of the electrical conductor 11 and *D*2 is the outer diameter of the ferromagnetic material 12.

Since the thickness *t* of the ferromagnetic material 12 may be expressed as $$D2-D1/2$$

the longitudinal sectional area *S* of said ferromagnetic material may be expressed as $$S=t(LL)=(D2-D1)\ (LL/2)$$

The average length *m* of the magnetic path may therefore be expressed as $$\pi(D2+D1)/2$$

The initial permeability in the circumferential direction of the conductor 11 is $\mu o$, and said initial permeability is proper to the ferromagnetic material 12. The number of windings *N* of each of the inductance elements of FIGS. 5*a* and 5*b* is obviously 1. As evidenced from the equation for the inductance element of FIG. 5*a*, when the structure of the longitudinal section of said inductance element is fixed, the inductance *Lo* may be determined arbitrarily by the length *LL* of said inductance element, since said inductance is proportional to said length.

FIG. 6 illustrates the relation between the length *LL* of the inductance element of FIG. 5*a* and the inductance *Lo* thereof. FIG. 6 also illustrates the relation between the length *LL* of the inductance element and the suppressing effect on the half-selected word pulse I*n* in the word driving circuit as a characteristic exhibited during the actual operation of the inductance element. Furthermore, FIG. 6 illustrates the relation between the length *LL* of the inductance element and the full-selected word pulse I*s*, as well as the relation between said length and the degree of improvement I*s*/I*n*. The characteristics illustrated in FIG. 6 may be provided by utilizing an inductance element having ferromagnetic material 12 consisting of a permalloy.

The permalloy comprises 0.4% Mn, 4.5% Mo, 81.2% Ni and 13.9% Fe. The inductance element has an outer diameter of 0.2 mm. and an electrical conductor 11 of composite wire comprising a copper alloy having a diameter of 0.16 mm. lightly rolled into a band-shaped configuration having a width of 0.26 mm. and a thickness of 0.13 mm. The band-shaped wire is finally magnetically annealed.

The driving circuit utilized to provide the curves of FIG. 6 comprises ferrite switching cores having an outer diameter of 4.3 mm., an inner diameter of 2.5 mm. and an altitude or axial length of 2.0 mm. The driving circuit utilizes a copper band having a thickness of 0.05 mm., a width of 1.25 mm. and a length of 200 mm., as the word line. The copper band is inserted into the ferrite switching cores. One hundred thirty-six memory elements are coupled with the word line. The magnetic wire or inductance element 13 of our invention (FIGS. 5*a* and 5*b*) may be fabricated or manufactured either by plating of ferromagnetic material such as a permalloy on the surface of an electrical conductor or by mechanically coupling an electrical conductor with a hollow cylindrical configuration of a permalloy.

Figure 7D:
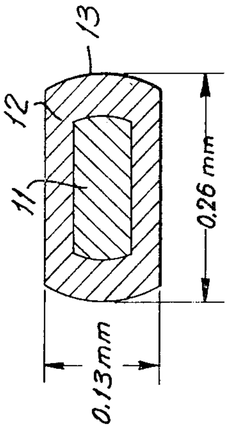
Figure 7D:
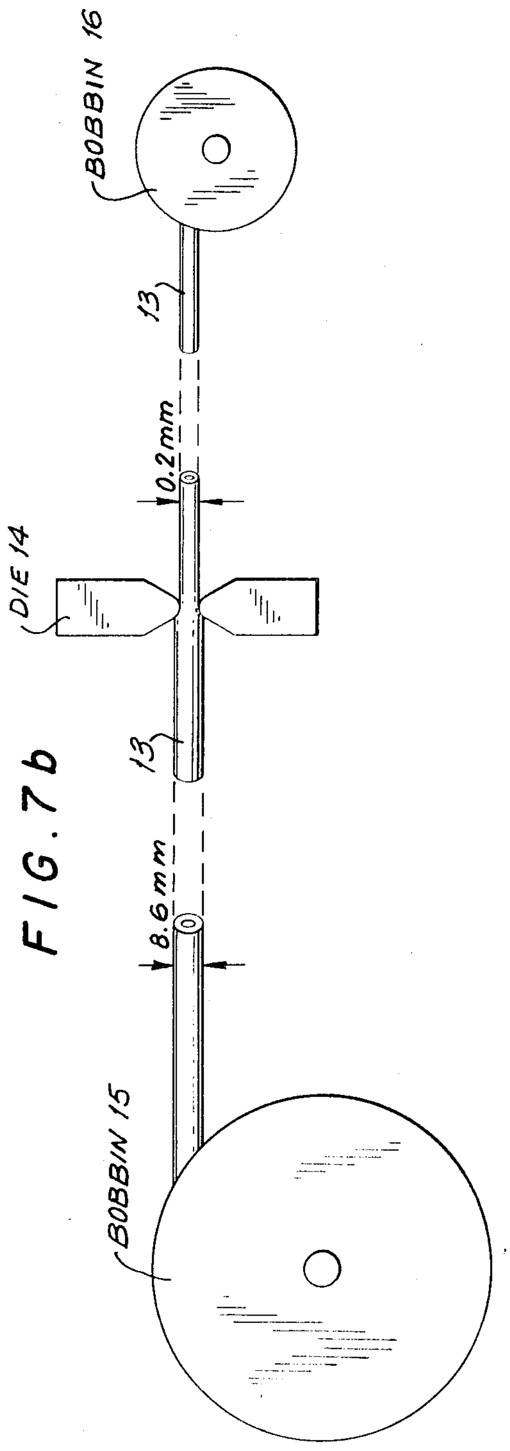
Figure 7A:
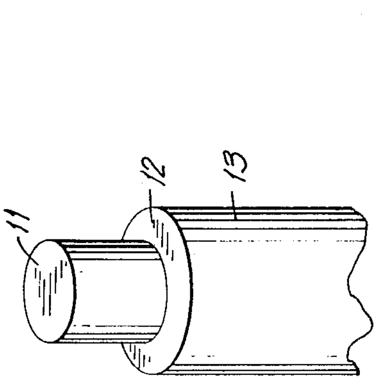

A method of manufacture of a magnetic wire or inductance element 13 of the invention by mechanical coupling is illustrated in FIGS. 7*a*, 7*b*, 7*c* and 7*d*. As shown in FIG. 7*a*, a solid cylindrical electrical conductor 11, comprising a stable electrical conductive metal, such as, for example, copper, and having a diameter of 7 mm., is inserted into a hollow cylindrical configuration of ferromagnetic material 12. The ferromagnetic material comprises a permalloy having an outer diameter of 8.6 mm. and an inner diameter of 7.0 mm.

As shown in FIG. 7*b*, the ferromagnetic material 12, with the inserted electrical conductor 11, are drawn, by the drawing method utilizing a die 14, while they are heated at a suitable temperature. In the drawing process, the conductor 11 of the ferromagnetic material 12 are properly mutually diffused and coupled at their contacting surfaces and are substantially similarly reduced in size. The resultant product is a magnetic wire or inductance element 13 having a diameter of 0.2 mm.

Figure 7C:
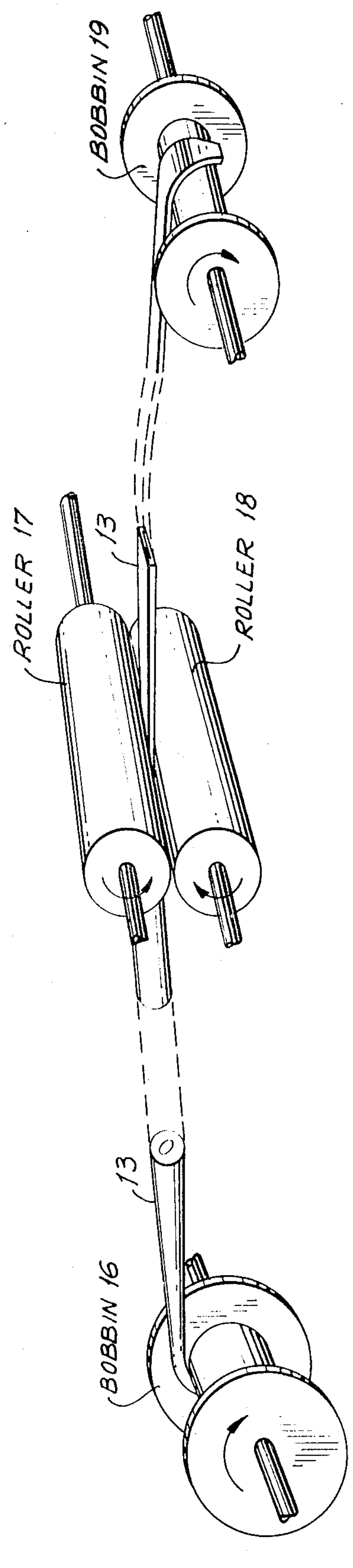

As shown in FIG. 7*c*, the magnetic wire 13 is lightly rolled by rollers 17 and 18 into a band having a width of 0.26 mm. and a height of 0.13 mm. A cross section of the resultant magnetic wire or inductance element is shown in FIG. 7*d*. In the illustration of FIGS. 7*a*, 7*b*, 7*c* and 7*d*, the magnetic wire 13 is band-shaped in order to prevent the twisting of said wire and to facilitate handling of the ends of said wire. Obviously, the magnetic wire 13 may be produced without the rolling process illustrated in FIG. 7*c*. This will result in an inductance element of the type illustrated in FIG. 5*a*, rather than that of FIG. 5*b*.

FIG. 8*a* illustrates a method of mounting the inductance element in a word selective driving system. In the method illustrated by FIG. 8*a*, a metal band 20 is utilized to affix a switching core to each word line, so that a switching core C1 is affixed to a word line W1. Therefore, if a magnetic wire or inductance element 13 of our invention, shaped as shown in FIG. 8*b*, is utilized as the metal band 20, said metal band functions to suppress half-select noise as well as to affix a switching core to a word line.

If the inductance element of our invention is utilized as the affixing band 20 of FIGS. 8*a* and 8*b*, it is necessary to affix the ends of said metal band to two surfaces of the word line W. This results in difficulties in assembly.

The assembly difficulties are resolved by limiting the operating surface to one surface of the word line W. To accomplish this, a core holding printed circuit plate is utilized. As shown in FIGS. 9*a* and 9*b*, a holding plate 21 is provided. A plurality of electrical conductors 22*a*, 22*b*, . . . 22*c* connect the word lines W1, W2, . . . W3 to the cores C1, C2, . . . C3, respectively. The electrical conductors 22*a* to 22*c* are printed on the front surface of the holding plate 21. Notches or circular grooves are formed along an edge of the holding plate 21 and corresponding ones of the cores are fitted into said notches and retained therein. The word lines are affixed to the rear surface of the holding plate 21, as shown in FIG. 9*b*. One end of each of the word lines W1 to W3 passes through a corresponding one of each of switching cores C1 to C3 and is connected to one end 23 of a corresponding one of the printed conductors 22*a* to 22*c* (FIG. 9*b*). The other end of each of the word lines is bent in a loop around the memory element M and is connected to the other end 24 of the corresponding one of the conductors 22*a* to 22*c* printed on the holding plate 21 (FIG. 9*b*).

In accordance with the invention, as shown in FIG. 10*a*, an inductance element 26 of our invention is provided by combining a plurality of magnetic wires or inductance elements 13. Each of the magnetic wires 13 comprises an electrical conductor 11 and a ferromagnetic material 12 covering the surface of said electrical conductor, as illustrated in FIGS. 5*a* and 5*b*. The magnetic wires are equidistantly spaced from each other in parallel relation and are affixed to each other in such relation by electrical insulating material 25 interposed therebetween.

If the inductance element 26 of FIG. 10*a* is affixed to a surface of the holding plate 21 of FIGS. 9*a* and 9*b*, as shown in FIG. 10*b*, said inductance element may function as conductors for connecting the word lines W1, W2, . . . W3 as well as inductance elements, and may thereby facilitate the affixing of the inductance element, since it is then limited to one surface of the holding plate.

The intervals between the magnetic wires 13 are varied in accordance with the purpose of the inductance element 26. However, when the inductance element 26 is utilized as illustrated in FIGS. 9*a* and 9*b*, the intervals between the word lines. The electrical insulating material 25 may comprise any suitable electrical electrical insulator which firmly holds the magnetic wires 13 in position. Suitable electrical insulating material for the insulator 25 may comprise flexible and thermoplastic materials.

The inductance element 26 of our invention, as illustrate in FIGS. 10*a* and 10*b* may be manufactured by a laminate method, a mold method, or other suitable method. FIGS. 11*a*, 11*b* and 11*c* illustrate a laminate method for manufacturing the inductance element of FIGS. 10*a* and 10*b*. As shown in FIG. 11*a*, each of a plurality of magnetic wires 13 is wound on a corresponding one of a plurality of bobbins or rollers 19*a*, 19*b*, . . . 19*c*. The magnetic wires 13 are fed, by a guide roller 31 having a plurality of guide grooves formed in its surface in spaced relation at a suitable separation from each other, to a pair of rollers 29 and 30. The magnetic wires 13 pass between the rollers 29 and 30 with Mylar tapes 32 and 33 supplied from bobbins or rollers 34 and 35, respectively. The inside surface of each of the Mylar tapes 32 and 33 is coated with a polyethylene film.

The rollers 29 and 30 affix the magnetic wire 13 to the polyethylene films on the inside surface of the Mylar tapes. This is accomplished by pressure and by the heating of the rollers 29 and 30 to a temperature which melts the polyethylene. The band-shaped inductance element is drawn from between the rollers 29 and 30, continuously.

The inductance element produced by the method of FIG. 11*a* is cut at desired lengths, and unnecessary film is stripped from both sides of each of the component inductance elements 13 to provide connecting ends for each magnetic wire. A cut section is shown in FIG. 11*b*.

FIG. 11*c* shows a resulting cut section with stripped magnetic wire ends. The inductance element of our invention, as shown in FIG. 11*c*, may thus be manufactured in large quantities and the ends thereof may be handled with considerable facility. The inductance element may be affixed to a core holding plate with suitable adhesive material. The inductance element of the invention may be utilized not only for the suppression of half-select noise, but may also be utilized as a general inductance element.

While the invention has been described by means of specific examples and in specific embodiments, we do not wish to be limited thereto, for obvious modifications will occur to those skilled in the art without departing from the spirit and scope of the invention.

We claim:

1. A memory device having a plurality of memory elements; a plurality of word lines in operative proximity with the memory elements; a plurality of switching cores in operative proximity with the word lines for selectively controlling the word lines; a plurality of driver circuits in operative proximity with the switching cores for selectively controlling the switching cores; a plurality of readout means connected to the memory elements for reading out the outputs of the memory elements; and an inductance element connecting individual word lines, inductance element comprising a plurality of magnetic wires, each of said magnetic wires having a conductor and a ferromagnetic material covering the surface of said conductor, said magnetic wires being equidistantly spaced from each other in parallel relation, and electrical insulating material interposed between and affixing said magnetic wires to each other.

2. A memory device as claimed in claim 1, wherein said electrical insulating material comprises flexible thermoplastic tape.

3. A memory device as claimed in claim 1, wherein said electrical insulating material comprises Mylar tapes having a polyethylene film on their inside surfaces.

4. A memory device as claimed in claim 1, wherein said ferromagnetic material comprises a permalloy.

* * * * *